US011182454B2

(12) United States Patent
Arning et al.

(10) Patent No.: US 11,182,454 B2
(45) Date of Patent: *Nov. 23, 2021

(54) OPTIMIZING WEB PAGES BY MINIMIZING THE AMOUNT OF REDUNDANT INFORMATION

(71) Applicant: INTERNATIONAL BUSINESS MACHINES CORPORATION, Armonk, NY (US)

(72) Inventors: Andreas Arning, Tuebingen (DE); Klaus Rindtorff, Weil im Schoenbuch (DE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/740,561

(22) Filed: Jan. 13, 2020

(65) Prior Publication Data

US 2020/0151235 A1 May 14, 2020

Related U.S. Application Data

(63) Continuation of application No. 15/692,663, filed on Aug. 31, 2017, now Pat. No. 10,579,698.

(51) Int. Cl.
*G06Q 30/00* (2012.01)
*G06F 16/957* (2019.01)
*G06Q 10/06* (2012.01)

(52) U.S. Cl.
CPC ......... *G06F 16/9577* (2019.01); *G06Q 10/06* (2013.01)

(58) Field of Classification Search
CPC ............ G06F 16/9577; G06F 3/04842; G06F 3/0482; G06F 17/2247

(Continued)

(56) References Cited

U.S. PATENT DOCUMENTS 8,566,332 B2 10/2013 Huberman et al.
8,700,588 B2* 4/2014 Henkin .............. G06Q 30/0247
707/705

(Continued)

FOREIGN PATENT DOCUMENTS

CN 103294711 A 9/2012

OTHER PUBLICATIONS

IBM, List of IBM Patents or Patent Applications Treated as Related, Appendix P, dated Jan. 13, 2020, 2 pages.

(Continued)

*Primary Examiner* — Hassan Mrabi
(74) *Attorney, Agent, or Firm* — Anthony R. Curro (57) ABSTRACT

An optimization system receives a first information item to be placed within a web page that is displayed on a graphical user interface. The optimization system retrieves stored user data about the first information item from a user history database. The optimization system calculates a redundancy value for the first information item, which is a measure of the frequency with which the user has interacted with the first information item in the past. The optimization system compares the redundancy value for the first information item to a predetermined threshold value. When the redundancy value of the information item is greater than or equal to the predetermined threshold value, the optimization system requests a second information item from the information source server. The optimization system receives the second information item and places the second information item on the web page that is displayed on the graphical user interface.

21 Claims, 5 Drawing Sheets

(58) Field of Classification Search
USPC .......................................................... 715/760
See application file for complete search history.

(56) References Cited

U.S. PATENT DOCUMENTS

| | | | |
|---|---|---|---|
| 2006/0143083 A1* | 6/2006 | Wedeen | G06Q 30/02 705/14.69 |
| 2008/0263458 A1* | 10/2008 | Altberg | G06Q 30/0241 715/757 |
| 2009/0089326 A1 | 4/2009 | Balasubramanian | |
| 2009/0119284 A1 | 5/2009 | Chen et al. | |
| 2010/0131455 A1* | 5/2010 | Logan | G06F 16/9577 707/602 |
| 2011/0126122 A1 | 5/2011 | Forman et al. | |
| 2013/0226703 A1* | 8/2013 | Murphy | G06Q 30/02 705/14.58 |
| 2016/0283055 A1 | 9/2016 | Haghighat et al. | |
| 2017/0111467 A1* | 4/2017 | Zhang | G06F 16/954 |
| 2019/0065618 A1 | 2/2019 | Arning et al. | |

OTHER PUBLICATIONS

Spring et al., "A Protocol-Independent Technique for Eliminating Redundant Network Traffic", 2000, ACM, pp. 1-9.
Leskovec et al., "Mining of Massive Datasets", Chapter 3, Finding Similar Items, pp. 73-128, Mar. 2014.
Mell et al., "The NIST Definition of Cloud Computing", Recommendations of the National Institute of Standards and Technology, Special Publication 800-145, Sep. 2011, 7 pages.
Resource Optimization in Automatic Web Page Classification Using Integrated Feature Selection and Machine Learning.
Tsai et al., Abstract for "Information Services for novelty mining", The Knowledge Engineering Review, vol. 29, Issue 2, Mar. 2014, pp. 234-247.
Wikipedia, "Cosine similarity", printed on Jun. 15, 2017, pp. 1-5, https://en.wikipedia.org/wiki/Cosine_similarity.
Wikipedia, "Jaccard index", printed Jun. 15, 2017, pp. 1-6,, https://en.wikipedia.org/wiki/Jaccard_index.

* cited by examiner

OPTIMIZING WEB PAGES BY MINIMIZING THE AMOUNT OF REDUNDANT INFORMATION

BACKGROUND

The present invention relates generally to the field of information appearing on a web browser and more particularly to minimizing the appearance of redundant information on web pages or websites.

Web pages or websites often show information about multiple topics aggregated onto a single web page. The information often comes from an external information provider used by several web pages or websites such that the same information may be repeated on multiple web pages or websites. Once a piece of information has been read by a user, it is not new to that user anymore and thus might not interesting or be valuable to that user anymore.

Repetition of digital information can cause users to confuse brands or information sources with their competitors. This confusion manifests itself by causing users to mismatch brand names with the slogans or products that the brands produce. Repetition of the same information to a user additionally renders the information less valuable or interesting to the user.

BRIEF SUMMARY

Additional aspects and/or advantages will be set forth in part in the description which follows and, in part, will be apparent from the description, or may be learned by practice of the invention.

An method, computer program product, and system for optimizing web pages includes receiving a first information item to be placed within a web page that is displayed on a graphical user interface. The optimization method and system retrieves stored user data about the first information item from a user history database. The optimization system calculates a redundancy value for the first information item, which is a measure of the frequency with which the user has interacted with the first information item in the past. The optimization system compares the redundancy value for the first information item to a predetermined threshold value. When the redundancy value of the information item is greater than or equal to the predetermined threshold value, the optimization system requests a second information item from the information source server. The optimization system receives the second information item and places the second information item on the web page that is displayed on the graphical user interface.

It is beneficial for sources that advertise or share news to ensure that the information does not become redundant or annoying to a user. In limiting the number of times a user sees a particular piece of information, the source of that information can transmit their intended message while maintaining the user memory for brand claims.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to a method and a system for optimizing web pages by minimizing the appearance of redundant information items using data collected during user internet browsing. An information item can be, but is not limited to, an advertisement, a hyperlink, a photograph, a headline, or any other type of information that can be communicated via a web page or website. An optimization system receives and stores data about information items that a user has interacted with, including the time the user interacted the information item, the web address of the web page or website on which the user interacted with the information item, the source of the information item that the user interacted with, and content of the information items. This data is analyzed by the optimization system to ensure that the user does not see the same information item multiple times. A cognitive classification module classifies the information items into topical category groups so that the user will not see information items from the same topical category group multiple times. The optimization system can detect whether a user has interacted with an information item and can notify the source of the information item whether the user has interacted with that item before. The optimization system calculates a value that indicates the redundancy of an information item to a user and transmits this redundancy value to the source of the information item. Based on this feedback, the optimization system requests and receives a new information item with a lower redundancy value from the information source server.

When a user accesses a web page or website, the user is identified, for example, by his Internet Protocol (IP) address, his browser history, or his tracked internet activity. A detection module determines whether the user has interacted with an information item by determining whether the user clicks on an information item, whether the user hovers his mouse over an information item for a predetermined minimum time, whether the user has a sensor that follows his eye movement to determine whether the user focuses on the information item, and/or any other method that can detect whether the user has interacted with an information item. When the user interacts with an information item, the optimization system stores the content of the information item as well as the source of the information item, the web address of the web page or website on which the user interacted with the information item, and the time that the user interacted with the information item. The optimization system additionally classifies and stores the information item into a topical category group of information items with similar characteristics, such as similar word usage between the information items.

The optimization system analyzes each information item to determine whether the user has interacted with that information item and how frequently he interacted with the information item. The optimization system calculates a redundancy value for each information item the user interacts with. The redundancy value is a measure of the frequency with which the user has interacted with the information item in the past. The optimization system uses this information to guide the information source server in the selection of an information item for transmission to the user. For each information item that the user interacts with, the optimization system stores the time the user interacted the information item, the web address of the web page or website on which the user interacted with the information item, the source of the information item that the user interacted with, the redundancy value of the information item, and the content of the information item for a predetermined amount of time and deletes the information item data after the user has not interacted with the information item for the predetermined time. Reducing the redundancy of information items allows the information item source to expose a user to different information items and reduces user confusion among different information item sources.

Figure 1:
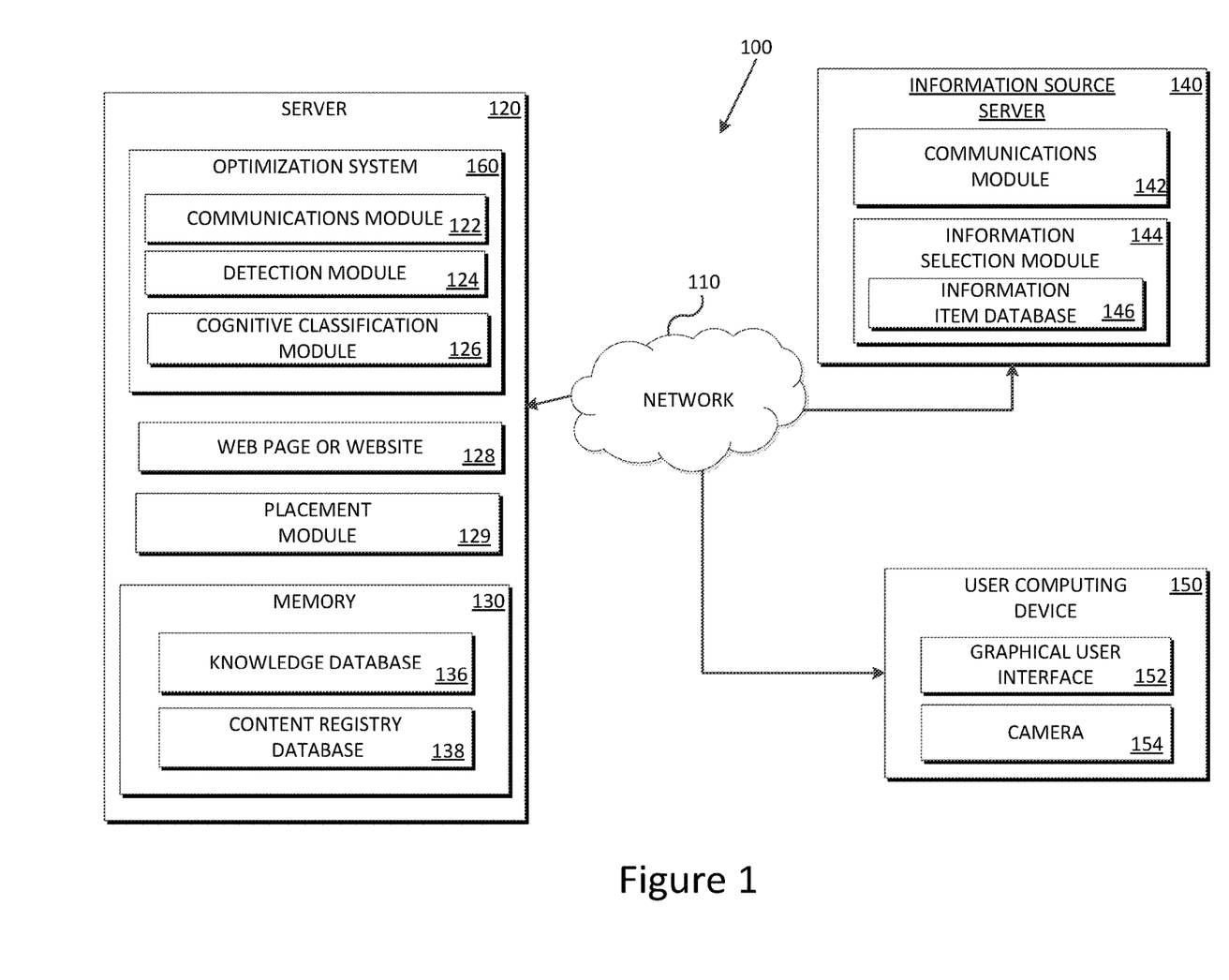
FIG. 1 is a functional block diagram illustrating a system for minimizing the appearance of redundant information on web pages in accordance with an embodiment of the present invention.

FIG. 1 is a functional block diagram illustrating a system for optimizing web pages or websites 128 by minimizing the amount of redundant information 100 displayed on a user computing device 150, in accordance with an embodiment of the present invention. The system for optimizing web pages or websites 128 by minimizing the amount of redundant information 100 includes a server 120, an information source server 140, and a user computing device 150, that can communicate with each other via a network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between the user computing device 150, the information source server 140, and the server 120 in accordance with one or more embodiments of the invention.

The user computing device 150, shown in FIG. 1, represents a computing device that include a user interface, for example, a graphical user interface (GUI) 152 and a camera 154. The graphical user interface 152 can be any type of application that is able to display a web page or website 128. For example, the application can be a web browser, a web application, a graphical application, an editing application or any other type of application/program that allows a user to upload, change, delete, alter, or update data accessible to the optimization system.

The user computing device 150 may be any type of computing device that is capable of connecting to network 110, for example, a laptop computer, tablet computer, netbook computer, personal computer (PC), a desktop computer, a smart phone, a wearable computing device, or any programmable electronic device supporting the functionality required by one or more embodiments of the invention. The user computing device 150 may include internal and external hardware components, as described in further detail below with respect to FIG. 3. In other embodiments, the server 120 and the information source server 140 may operate in a cloud computing environment, as described in further detail below with respect to FIGS. 4 and 5.

The information source server 140, shown in FIG. 1, includes a communications module 142 and an information selection module 144. The communications module 142 can communicate with the server 120 and the user computing device 150 via the network 110. The communications module 142 receives information from, and transmits information to, the server 120 and the user computing device 150 via the network 110.

The information selection module 144 selects an information item from a plurality of information items stored in an information item database 146 to transmit to the user computing device 150. An information item can be, but is not limited to, an advertisement, a hyperlink, a photograph, a headline, or any other type of information that can be communicated via a web page or website 128. The information item database 146 stores the information items and the redundancy values transmitted to the information source server 140 by the optimization system 160. A redundancy value is a measure of how often a user interacts with an information item.

The server 120, shown in FIG. 1, includes an optimization system 160, a web page or website 128, a placement module 129, and a memory 130. The server 120 may include internal and external hardware components, as depicted and described in further detail below with reference to FIG. 3. In other embodiments, the server 120 may include internal and external hardware components, as depicted and described in further detail below with respect to FIG. 4, and operate in a cloud computing environment, as depicted in FIG. 5.

The web page or website 128 is accessible by the user computing device 150 and displayed by the graphical user interface 152, via network 110. The user can interact with the web page or website 128 over the graphical user interface 152. The web page or website 128 has designated spaces for the display of information items that are transmitted to the web page or website 128 by the optimization system 160 and placed in the designated spaces by the placement module 129.

The placement module 129 places information items into the designated spaces on the webpage or website 128. The placement module 129 receives an information item from the optimization system 160. The information items placed onto the web page or website 128 by the placement module 129 include the original information item transmitted by the information source server 140 and any new information items requested by the optimization system 160.

The optimization system 160 includes a communications module 122, a detection module 124, and a cognitive classification module 126. The optimization system 160 is currently illustrated as being part of the server 120, but the optimization system 160 can be downloaded by the user as a web browser plug-in. Additionally, the optimization system 160 can be implemented as part of the browser itself. The communications module 122 can communicate with the information source server 140 and the user computing device 150 via the network 110. The communications module 122 receives information from, and transmits information to, the information source server 140 and the user computing device 150 via the network 110. The information items received from the communications module 122 are sent to the placement module 129 for placement on the web page or website 128.

The detection module 124 detects whether the user has interacted with an information item being displayed on the graphical user interface 152. For example, the detection module 124 can detect whether the user clicks on an information item, whether the user hovers his mouse over an information item for a predetermined minimum time, and/or whether the user has a sensor that follows eye movement to determine whether the user focused on the information item. In addition, the detection module 124 can use a camera 154 on the user computing device 150 to determine whether the user has focused on the information item. For example, when the camera 154 is enabled to view the eye movement of the user on the user computing device 150, the camera 154 can determine whether the user focused on the information item. Furthermore, when no sensor for detection of user interaction is used, even the presentation of an information item to the user via the graphical user interface 152 shall be counted as an interaction of the user with the information item.

When a user interacts with an information item, the detection module 124 transmits the interaction data to the knowledge database 136 for storage. The interaction data can include the web address of the web page or website 128 on which the user interacted with the information item, the time at which the user interacted with the information item, and/or the source of the information item, such as the information source server 140. For example, the detection module 124 might transmit the message, "User A accessed information item B on web page 128 C on DD/MM/YYYY. The information item was sent to web page 128 C from source D."

The detection module 124 also calculates a redundancy value for each information item, where the redundancy value is a measure of how often a user interacts with an information item. A redundancy value for an information item is calculated based the frequency with which the user has interacted with that information item in the past. One form of a redundancy value calculator is a counter in the knowledge database 136 that keeps track of how many times a user has interacted with an information item. The redundancy value calculation can also consider the frequency with which the user has interacted with information items of the same topical category group as determined by the cognitive classification module 126. The higher the redundancy value, the more frequently a user has interacted with the information item, and thus the more redundant the information item is.

The redundancy value is stored in the knowledge database 136 as well as in the information item database 146. The knowledge database 136 is a data store that stores data about the web address of the web page or website 128 on which the user interacted with the information item, the redundancy value of the information item, the source of an information item interacted with by the user, as well as the time user interacted with the information item. The knowledge database 136 stores this data for each information item. The optimization system 160 uses this data to determine whether the information item being received is redundant to the user by calculating a redundancy value for the information item. If the received information item is above a predetermined redundancy value threshold, the optimization system 160 requests a new information item from the information source server 140.

When the optimization system 160 determines that the user has previously interacted with the information item received from the information selection module 144, the optimization system 160 calculates the redundancy value for that information item. The optimization system 160 transmits the redundancy value to the information source server 140 and stored in the information item database 146. The optimization system 160 determines if the redundancy value of the information item is greater than a predetermined threshold value. When the redundancy value of the item is less than the predetermined threshold value, the placement module 129 places the information item into the designated space on the web page or website 128 and the optimization system 160 transmits the placed information item to the user computing device 150 to be displayed. When the redundancy value of the information item is greater than the predetermined threshold value, the optimization system 160 requests a new information item from the information selection module 144.

When the optimization system 160 requests a new information item, the information selection module 144 accesses the information item database 146 to choose a new information item. When choosing a new information item, the information selection module 144 compares the redundancy value of the originally transmitted information item to the stored redundancy values of the information items in the information item database 146. This enables the information selection module 144 to transmit the information item with the lowest redundancy value to the optimization system 160. If there is no information item in the information item database 146 with a lower redundancy value than the originally transmitted information item, the information selection module 144 can choose to transmit the original information item to the optimization system 160 again. Another option would be for the information selection module 144 to decline to transmit a new information item altogether.

The cognitive classification module 126 classifies information items into topical category groups by identifying the topic of an information item. The topical category groups can include, but are not limited to, business, technology, entertainment, news, or any other type of topical category group. Each information item that the user interacts with is classified into a topical category group by the cognitive classification module 126. The cognitive classification module 126 can take several factors into account when classifying an information item into a topical category group including the words used in the heading, the description, and/or the body of an information item. For example, an information item that contains the words "score," "team," and "game" would be classified broadly as a "sports"

information item. Additionally, the cognitive classification module 126 may be able to determine that two articles titled "Germany Loses to United States in Soccer Championship" and "United States Wins Soccer Championship Over Germany" are about the same event due to the similarity of the words contained within the articles. The cognitive classification module 126 would classify the two articles into the same topical category group. The cognitive classification module 126 could also classify information items into sub-topical category groups. For example, "sports" could be a broad topical category group that encompasses "tennis," "football," "soccer," and/or more specific sub-topical category groups. The cognitive classification module 126 transmits the assigned topical category group of each information item to the content registry database 138, a data store that stores data about the content of an information item, for storage in topical category groups.

Information items are classified into topical category groups by the cognitive classification module 126 in order to categorize the information items to determine how redundant an information item or a topical category group is to the user. For example, a user might interact with multiple information items that are classified into the "business" topical category group by the cognitive classification module 126. The optimization system 160 could consider the topical category group classifications of an information item when calculating the redundancy value by calculating a redundancy value for each information item, as well as for each topical category group. For example, the optimization system 160 would calculate the redundancy value for the "business" information item, but would additionally calculate a redundancy value for the "business" topical category group itself. This enables the optimization system 160 to transmit information items about many different topics to the user computing device 150, rather than have the user interact with the same topical category group of information repeatedly.

The memory 130 is a data store that stores data about the source of an information item, the time when the user interacted with the information item, the topical category group assigned to the information item, the redundancy value of an information item, and the web address of the web page or website 128 on which the user interacted with an information item. The memory 130 includes a knowledge database 136 and a content registry database 138.

The knowledge database 136 is a data store that stores data about the web address of the web page or website 128 on which the user interacted with the information item, the redundancy value of the information item, the source of an information item interacted with by the user, and the time user interacted with the information item. The web address of an information item refers to the web address of the web page or website 128 on which the user interacted with the information item. The source of an information item refers to the information source server 140 that transmitted the information item to the server 120. The time that the user interacted with the information item is the time used by the optimization system 160 to determine how long ago a user interacted with an information item. This time data is used to calculate the redundancy value of an information item. Additionally, the time data is used by the knowledge database 136 as a starting point for the predetermined storage period of the information item in the knowledge database 136. The knowledge database 136 also stores the redundancy value of each information item as calculated by the detection module 124.

The time at which the user interacted with the information item, the web address of the web page or website 128 on which the user interacted with the information item, the source of the information item, and the redundancy value for each information item is stored in the knowledge database 136 for a predetermined amount of time, after which time the knowledge database 136 automatically deletes the data about the time at which the user interacted with the information item, the web address of the web page or website 128 on which the user interacted with the information item, the source of the information item, and the redundancy value for that information item. The predetermined amount of time after which the knowledge database 136 deletes data about an information item is the same time after which an information item is no longer considered redundant to the user. For example, the predetermined time after which the knowledge database 136 deletes an information item might be six months. Thus, for six months after the last time a user interacted with the information item, the data about that information item will be stored in the knowledge database 136. While the information item is stored in the knowledge database 136, the optimization system 160 will instruct the information source server 140 not to transmit that information item to the user. Once six months pass during which the user did not interact with the information item, the knowledge database 136 deletes the data about that information item because the appearance of that information item would no longer be redundant to the user.

The content registry database 138 is a data store that stores data about the content of an information item. The content of an information item refers to the topical category and/or sub-topical category group of the information item as determined by the cognitive classification module 126. A topical category group of an information item can be business, news, entertainment, sports, science, and/or any other type of topical category group. The cognitive classification module 126 creates a new topical category group and/or sub-topical category group in the content registry database 138 when a user interacts with an information item from a new topical category group. For example, when the content registry database 138 had topical category groups for "business," "sports," and "entertainment," but the user interacts with an information item that the cognitive classification module 126 classifies as "science," the cognitive classification module 126 would create a new topical category group for "science" within the content registry database 138. The content registry database 138 deletes the topical category group data for each information item at the same predetermined time used by the knowledge database 136 to delete the data about the time at which a user interacted with the information item, the web address of the web page or website 128 on which the user interacted with the information item, source of the information item, and redundancy value of the information item.

Figure 2:
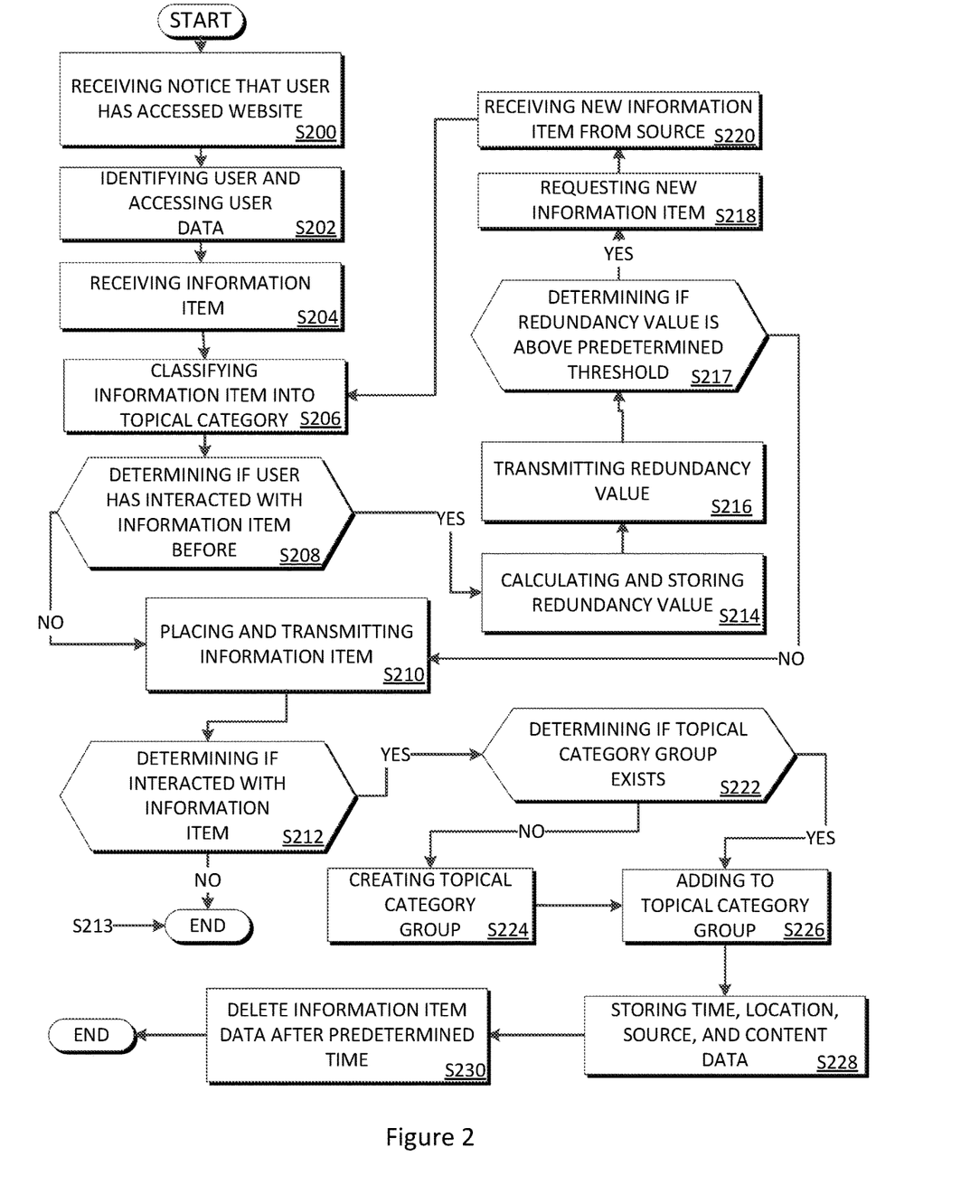
FIG. 2 is a flowchart depicting operational steps to classify and store the information items that a user has interacted with, as well as calculate the redundancy value of an information item, within the environment of FIG. 1, in accordance with an embodiment of the present invention.

FIG. 2 depicts the process or method by which the optimization system 160 minimizes the appearance of redundant information items during the user computing experience. The optimization system 160 receives notice that a user has accessed a web page or website 128 through an internet browser on a user computing device 150 (S200). The optimization system 160 identifies the user by his Internet Protocol (IP) address, his browser history, or his tracked internet activity and accesses the stored user data in the knowledge database 136 (S202). The stored user data includes, but is not limited to, the web address of the web page or website 128 on which the user interacted with the information item, the source of the information item, the time at which the user interacted with the information item, and the redundancy value data in the knowledge database 136. The optimization system 160 receives the information item from the information source server 140 (S204). The cognitive classification module 126 classifies the information item into at least one topical category group and/or sub-topical category group (S206).

The optimization system 160 determines whether the user has interacted with that information item before by accessing the data about the web address of the web page or website 128 on which the user interacted with the information item, the source of the information item, the time at which the user interacted with the information item, and the redundancy value in the knowledge database 136 and the topical category group data in the content registry database 138 (S208). When the user has not interacted with that information item before, the placement module 129 places the information item on the web page or website 128 and the optimization system 160 transmits the placed information item to the user computing device 150 to be displayed (S210).

When the user has interacted with that information item before, the optimization system 160 calculates and stores a redundancy value for that information item based the frequency with which the user has interacted with that information item in the past (S214). The optimization system 160 transmits the redundancy value for each information item, as well as the redundancy value for the topical category group that the information item was classified into by the cognitive classification module 126, to the information source server 140 for storage in the information item database 146 (S216).

The optimization system 160 determines if the redundancy value of the information item is greater than a predetermined threshold value (S217). When the redundancy value of the item is less than the predetermined threshold value, the placement module 129 places the information item into the designated space on the web page or website 128 and the optimization system 160 transmits the placed information item to the user computing device 150 to be displayed (S210).

When the redundancy value of the information item is greater than the predetermined threshold value, the optimization system 160 requests a new information item from the information selection module 144. The optimization system 160 requests a new information item from the information source server 140 (S218). The information selection module 144 searches the information item database 146 for an information item with a lower redundancy value than the originally transmitted information item, for an information item from a different topical category group, or for an information item that the user has never interacted with.

When there is no information item in the information item database 146 with a lower redundancy value than the originally transmitted information item, the information selection module 144 transmits the information item with the lowest redundancy value available. This information item could be the originally transmitted information item. For example, when the optimization system 160 determines that the original information item had a redundancy value of six, but the information item database 146 only has information items with redundancy values of seven, eight, and nine, the information source server 140 could choose to transmit the original information item again, or choose the information item with a redundancy value of seven.

Alternatively, the information selection module 144 could transmit an information item from a topical category group with a lower redundancy value than the topical category group of the originally transmitted information item. Finally, the information selection module 144 could choose not to transmit another information item to the optimization system 160 altogether.

The optimization system 160 receives the new information item from the information source server 140 (S220). The optimization system 160 repeats the process by which it classifies an information item and determines whether a user has previously interacted with an information item received from the information selection module 144 until an information item is received that the user has never interacted with, until the information item with the lowest available redundancy value is received from the information source server 140, or until the information source server 140 stops transmitting information items to the optimization system 160.

The placement module 129 places the information item into a designated space on the web page or website 128 and the optimization system 160 transmits the placed information item to the user computing device 150 to be displayed on the graphical user interface 152 (S210). The detection module 124 determines whether the user interacted with the information item (S212). The detection module 124 can detect, for example, when the user clicks on an information item, when the user hovers his mouse over an information item for a predetermined minimum time, or when the user has a sensor that follows eye movement to determine whether the user interacted with the information item. In addition, the detection module 124 can use a camera 154 on the user computing device 150 to determine whether the user has interacted with an information item. When the user has not interacted with the information item, the optimization system 160 stops and waits for the next information item run (S213).

When the detection module 124 determines that the user has interacted with the information item, the cognitive classification module 126 determines whether the previously identified topical category group of the information item exists as a topical category group in the content registry database 138 (S222). When a topical category group exists for that information item in the content registry database 138, that information item is added to the topical category group in the content registry database 138 (S226). When a topical category group does not yet exist for that information item in the content registry database 138, the cognitive classification module 126 creates a new topical category group in the content registry database 138 (S224). The information item is added to the new topical category group in the content registry database 138 (S226). The detection module 124 transmits the data about the web address of the web page or website 128 on which the user interacted with the information item, the source of the information item, the time at which the user interacted with the information item, and the redundancy value data to the knowledge database 136 for storage (S228). At a predetermined time after the user interacted with an information item, the knowledge database 136 deletes that information item (S230).

Figure 3:
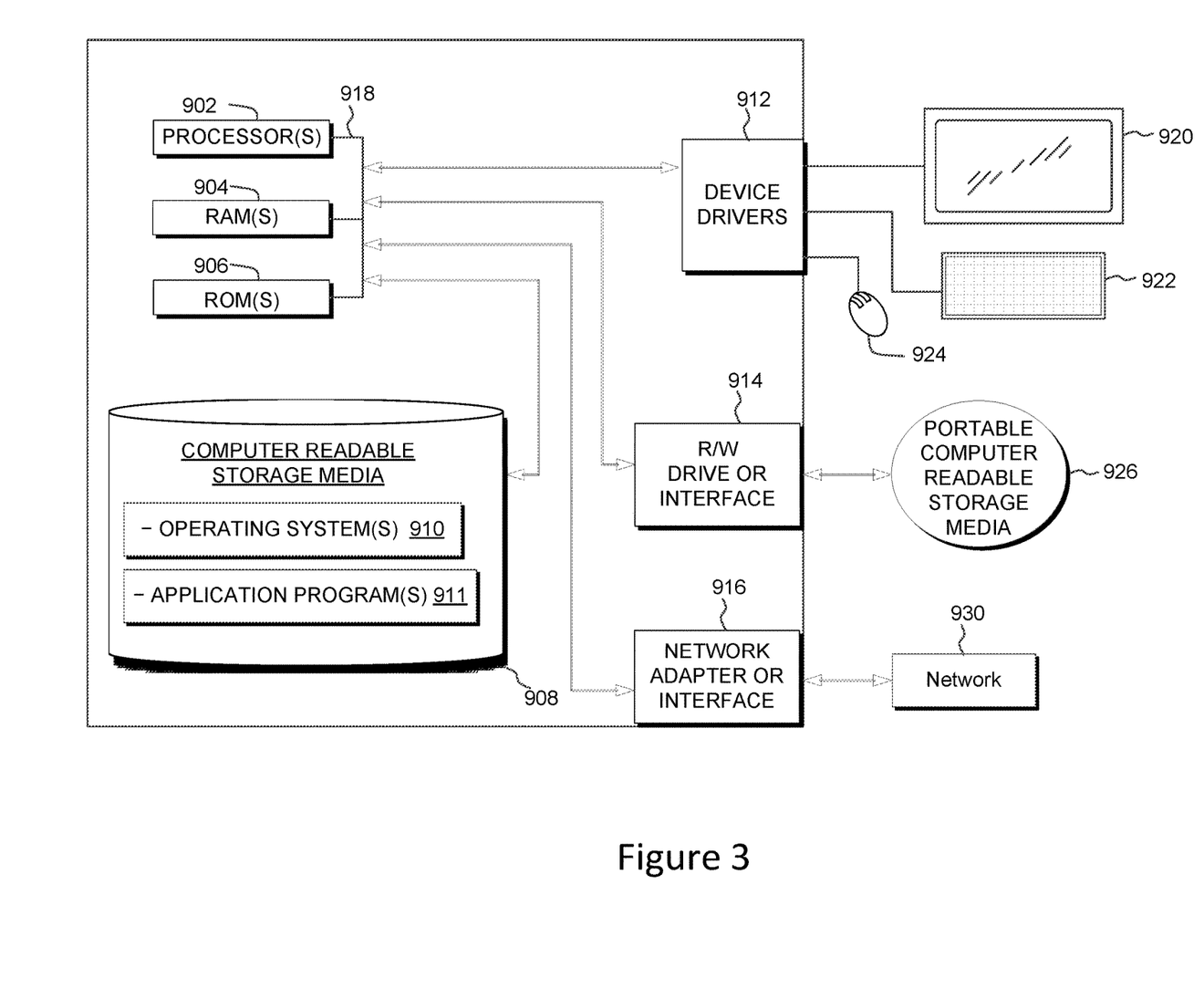
FIG. 3 is a block diagram of components of a computing device of the system to intelligently manage store inventory using a mobile application from FIG. 1, in accordance with embodiments of the present invention.

FIG. 3 depicts a block diagram of components of server 120 of the system for minimizing the appearance of redundant information on s web page or website 128 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

The server 120, the information source server 140, and the user computing device 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

The server 120, the information source server 140, and the user computing device 150 may also include a R/W drive or interface 914 to read from and write to one or more portable computer readable storage media 926. Application programs 911 on the server 120, the information source server 140, and the user computing device 150 may be stored on one or more of the portable computer readable storage media 926, read via the respective R/W drive or interface 914 and loaded into the respective computer readable storage media 908.

One or more operating systems 910, and one or more application programs 911, for example, the detection module 124 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The server 120, the information source server 140, and the user computing device 150 may also include a R/W drive or interface 914 to read from and write to one or more portable computer readable storage media 926. Application programs 911 on the server 120, the information source server 140, and the user computing device 150 may be stored on one or more of the portable computer readable storage media 926, read via the respective R/W drive or interface 914 and loaded into the respective computer readable storage media 908.

The server 120, the information source server 140, and the user computing device 150 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 120, the information source server 140, and the user computing device 150 may be downloaded to the computing device from an external computer or external storage device via a network 110 (for example, the Internet, a local area network or other wide area network or wireless network) and network adapter or interface 916. From the network adapter or interface 916, the programs may be loaded onto computer readable storage media 908. The network 110 may comprise copper wires, optical fibers, wireless transmission, routers, firewalls, switches, gateway computers and/or edge servers.

The server 120, the information source server 140, and the user computing device 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program item at any possible technical detail level of integration. The computer program item may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program items according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program items according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
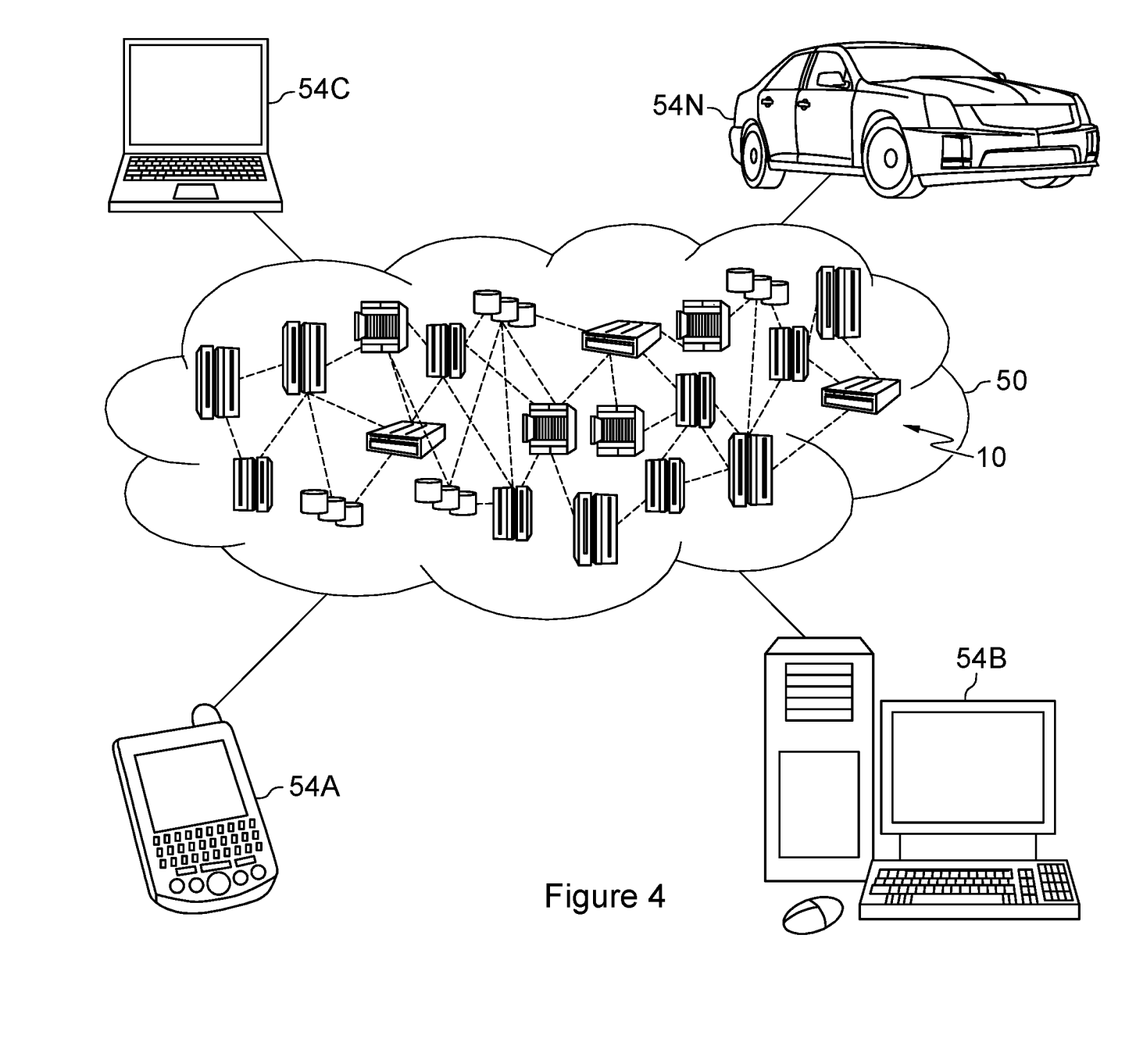
FIG. 4 depicts a cloud computing environment according to an embodiment of the present invention.
Figure 5:
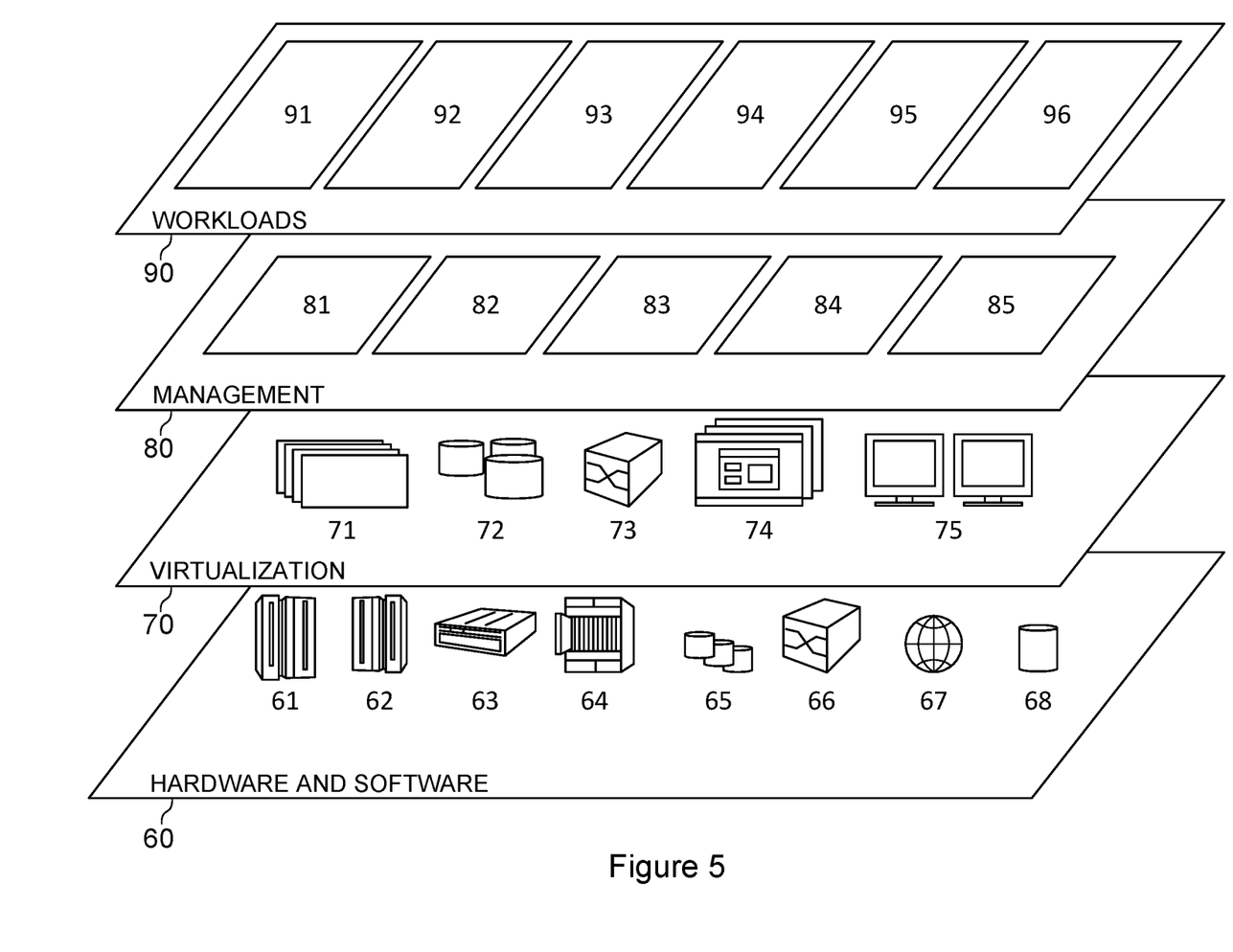
FIG. 5 depicts abstraction model layers according to an embodiment of the present invention.

Referring now to FIG. 4, illustrative cloud computing environment (50) is depicted. As shown, cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 4 are intended to be illustrative only and that computing nodes (10) and cloud computing environment (50) can communicate with any type of computerized device over any type of network and/or network addressable connection (e.g., using a web browser).

Referring now to FIG. 5, a set of functional abstraction layers provided by cloud computing environment (50) (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment (85) provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and inventory application 96.

Based on the foregoing, a computer system, method, and computer program item have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method comprising:
   receiving by a computer a first information item;
   classifying by the computer the first information item into a topical category group;
   determining whether a user has previously interacted with the first information item to be placed within a web page based on user data corresponding to the first information item stored in a database;
   responsive to determining that the user has previously interacted with the first information item, placing, by the computer, a second information item within the web page that is displayed on the graphical user interface; and
   responsive to determining that the user has not previously interacted with the first information item, placing, by the computer, the first information item within the web page that is displayed on the graphical user interface,
   wherein if the user has previously interacted with the first information item, the computer determines whether the topical category group exists within a content registry database, and if it exists, the first information item is added to the content registry database, and if it does not exist, the computer creates a new topical category group in the content registry database.

2. The method of claim 1, wherein the first information item includes one or more of:
   an advertisement, a hyperlink, a photograph, a headline, and any other type of information that can be communicated via a web page.

3. The method of claim 1, wherein the user data stored in the database includes at least a web address of the web page on which the user interacted with the first information item, an information source server of the first information item, and a time at which the user interacted with the first information item.

4. The method of claim 1, wherein the determining, by the computer, whether a user has previously interacted with a first information item includes: the user clicking on the first information item, or the user hovering his mouse over the first information item for a predetermined minimum time, or using a sensor on a user computing device that follows eye movement.

5. The method of claim 1, wherein determining whether a user has previously interacted with a first information item to be placed within a web page based on user data corresponding to the first information item stored in a database further comprises determining that a first redundancy value is greater than or equal to a predetermined threshold value by:
   calculating, by the computer, a first redundancy value; and
   comparing, by the computer, the first redundancy value to a predetermined threshold value to determine that the first redundancy value is greater than or equal to the predetermined threshold value.

6. The method of claim 5, wherein the calculating, by the computer, the first redundancy value, further comprises:
   counting, by the computer, each time the user was detected interacting with the first information item;
   wherein the calculated redundancy value is based on the number of times the user interacts with the first information item.

7. The method of claim 5, further comprising: transmitting, by the computer, the first redundancy value of the first information item to an information source server for storage.

8. The method of claim 7, wherein the information source server uses the received first redundancy value of the first information item to compare to a stored redundancy value for each of a plurality of information items and selects the second information item having a stored second redundancy value less than the first redundancy value.

9. The method of claim 1, wherein the second information item has the redundancy value less than the predetermined threshold value.

10. The method of claim 1, further comprising: calculating, by the computer, a third redundancy value for the topical category group, wherein the third redundancy value is the measure of the frequency with which the user has previously interacted with an information item from the topical category group; and transmitting, by the computer, the first redundancy value of the first information item and the third redundancy value for the topical category group to an information source server for storage.

11. The method of claim 10, wherein the information source server uses the received first redundancy value of the first information item and third redundancy value for the topical category group to compare to a stored redundancy value and a stored redundancy value for the topical category group for each of a plurality of information items and selects the second information item having a stored second redundancy value less than the first redundancy value and having a stored redundancy value for the topical category group less than the third redundancy value for the topical category group.

12. The method of claim 1, wherein user data for an information item previously interacted with is deleted from the database at a predetermined amount of time after the time the user interacted with the information item.

13. A computer program product for minimizing the appearance of redundant information, the computer program item comprising: one or more non-transitory computer-readable storage media and program instructions stored on the one or more non-transitory computer-readable storage media, the program instructions implementing a method comprising:
   receiving by a computer a first information item;
   classifying by the computer the first information item into a topical category group;
   determining whether a user has previously interacted with the first information item to be placed within a web page based on user data corresponding to the first information item stored in a database;
   responsive to determining that the user has previously interacted with the first information item, placing, by the computer, a second information item within the web page that is displayed on the graphical user interface; and
   responsive to determining that the user has not previously interacted with the first information item, placing, by the computer, the first information item within the web page that is displayed on the graphical user interface,
   wherein if the user has previously interacted with the first information item, the computer determines whether the topical category group exists within a content registry database, and if it exists, the first information item is added to the content registry database, and it does not exist, the computer creates a new topical category group in the content registry database.

14. The computer program product of claim 13, wherein the first information item includes one or more of: an advertisement, a hyperlink, a photograph, a headline, and any other type of information that can be communicated via a web page.

15. The computer program product of claim 13, wherein the user data stored in the database includes at least a web address of the web page on which the user interacted with the first information item, an information source server of the first information item, and a time at which the user interacted with the first information item.

16. The computer program product of claim 13, wherein determining whether a user has previously interacted with a first information item to be placed within a web page based on user data corresponding to the first information item stored in a database further comprises determining that a first redundancy value is greater than or equal to a predetermined threshold value by: calculating, by the computer, a first redundancy value; and comparing, by the computer, the first redundancy value to a predetermined threshold value to determine that the first redundancy value is greater than or equal to the predetermined threshold value.

17. A computer system for minimizing the appearance of redundant information, the computer system comprising:
one or more computer processors, one or more computer-readable storage media, and program instructions stored on one or more of the computer-readable storage media for execution by at least one of the one or more processors, the program instructions implementing a method comprising:
receiving by a computer a first information item;
classifying by the computer the first information item into a topical category group;
determining whether a user has previously interacted with the first information item to be placed within a web page based on user data corresponding to the first information item stored in a database;
responsive to determining that the user has previously interacted with the first information item, placing, by the computer, a second information item within the web page that is displayed on the graphical user interface; and
responsive to determining that the user has not previously interacted with the first information item, placing, by the computer, the first information item within the web page that is displayed on the graphical user interface,
wherein if the user has previously interacted with the first information item, the computer determines whether the topical category group exists within a content registry database, and if it exists, the first information item is added to the content registry database, and it does not exist, the computer creates a new topical category group in the content registry database.

18. The computer system of claim 17, wherein the first information item includes one or more of: an advertisement, a hyperlink, a photograph, a headline, and any other type of information that can be communicated via a web page.

19. The computer system of claim 17, wherein determining whether a user has previously interacted with a first information item to be placed within a web page based on user data corresponding to the first information item stored in a database further comprises determining that a first redundancy value is greater than or equal to a predetermined threshold value by: calculating, by the computer, a first redundancy value; and comparing, by the computer, the first redundancy value to a predetermined threshold value to determine that the first redundancy value is greater than or equal to the predetermined threshold value.

20. The computer system of claim 18, further comprising: comparing first redundancy value of the first information item to a redundancy value stored for each of a plurality of information items; and selecting the second information item having a stored second redundancy value less than the first redundancy value.

21. The computer system of claim 17, further comprising: calculating a third redundancy value for the topical category group, wherein the third redundancy value is the measure of the frequency with which the user has previously interacted with an information item from the topical category group; and transmitting the first redundancy value of the first information item and the third redundancy value for the topical category group to an information source server for storage; wherein the information source server uses the received first redundancy value of the first information item and third redundancy value for the topical category group to compare to a stored redundancy value and a stored redundancy value for the topical category group for each of a plurality of information items and selects the second information item having a stored second redundancy value less than the first redundancy value and having a stored redundancy value for the topical category group less than the third redundancy value for the topical category group.

* * * * *